Sept. 18, 1956 V. G. KRENKE ET AL 2,763,821
ELECTROMAGNETIC CONTACTOR
Filed March 6, 1953 4 Sheets-Sheet 1

Fig. I.

WITNESSES:
John E. Hursley
Urban H. Faubion

INVENTORS
Vincent G. Krenke and
Delbert Ellis
BY
Paul E. Friedemann
ATTORNEY

Sept. 18, 1956    V. G. KRENKE ET AL    2,763,821
ELECTROMAGNETIC CONTACTOR

Filed March 6, 1953    4 Sheets-Sheet 2

INVENTORS
Vincent G. Krenke and
Delbert Ellis
BY
Paul E. Friedemann
ATTORNEY

Sept. 18, 1956 V. G. KRENKE ET AL 2,763,821
ELECTROMAGNETIC CONTACTOR
Filed March 6, 1953 4 Sheets-Sheet 3

WITNESSES:
John E. Heasley
Urban H. Faubion

INVENTORS
Vincent G. Krenke and
Delbert Ellis
BY
Paul E. Friedemann
ATTORNEY

Sept. 18, 1956  V. G. KRENKE ET AL  2,763,821
ELECTROMAGNETIC CONTACTOR
Filed March 6, 1953  4 Sheets-Sheet 4

WITNESSES:
John E. Heasley
Urban H. Faubion

INVENTORS
Vincent G. Krenke and
Delbert Ellis
BY
Paul E. Friedemann
ATTORNEY

United States Patent Office 2,763,821
Patented Sept. 18, 1956

2,763,821

ELECTROMAGNETIC CONTACTOR

Vincent G. Krenke and Delbert Ellis, Beaver, Pa., assignors to Westinghouse Electric Corporation, East Pittsburgh, Pa., a corporation of Pennsylvania Application March 6, 1953, Serial No. 340,862

6 Claims. (Cl. 317—198)

This invention relates to contactors and components of contactors. More particularly the contactors contemplated are of the type in which a single electromagnet is employed to control the opening or closing of a plurality of circuits by means of the operation of the switches and contacts controlled by the energization or deenergization, as the case may be, of the electromagnet.

The contactors and components thereof shown, described, and claimed herein represent improvements in the contactors disclosed in the two applications of O. L. Taylor entitled "Electromagnetic Contactors," filed herewith and assigned to the same assignee.

The assembly of the magnet and related parts of electromagnetically operated switches of the type referred to herein should be such that the switch will be quiet and develop the necessary force travel relationship. The assembly should allow easy access to and removal of the operating coil and have a minimum number of parts to remove and handle. The moving parts should be of such design as to insure long operating life.

The quietness of operation and the operating life of A. C. magnets are contingent upon alignment of the seating pole faces of the armature and magnet, and upon the proper loading of the armature as well as proper shading. The above factors will depend upon the proper mounting of the armature if the magnet and the armature pole faces are properly ground so that a large proportion of these faces are in practical contact. When the armature is free, the only problem of alignment is to have the armature mounted in such a manner as to assume this position when mounted in its supporting member and when seated. A movement about any axis parallel to the pole faces of the armature tends to make the device noisy at much lower force values than when a load is applied to the armature along an axis perpendicular to the plane of the pole faces and through the theoretical center area of all pole faces in combination (this center does not necessarily fall within any of the actual seating areas). A load applied in such a manner is referred to as a balanced load.

Prior art methods of mounting armatures have two drawbacks. First, the free floating armature allows movement of the armature about its bearing parts with resultant wear in the armature mounting assembly. Second, there is no control over the movement of the armature until the armature is seated. Due to magnetic forces involved one pole face will always make contact before the other and the resultant relative movement in the area of contact of the pole faces cause wear on the pole face area.

Another factor which affects the armature and magnet face wear is the force of the impact of the two magnetic structures. Therefore, a mounting means for the electromagnetic contactor which will have a cushioning effect for the magnet and armature faces during operation, will decrease the armature and magnet face wear and increase the operating life of the contactor.

It is an object of this invention to provide a circuit controlling device of the character referred to which obviates the difficulties of the prior art devices and provides the requisite features.

Another object of this invention is to provide a circuit controlling device of the electromagnetically operated type having the load applied to the armature along an axis perpendicular to the plane of the pole faces and substantially through the theoretical center area of all pole faces.

A further object of this invention is to provide a circuit controlling device of the electromagnetically operated type such that the armature pole faces may be aligned with the magnet pole faces to give a balanced load condition and the armature pole faces are held in alignment with the magnet pole faces for any condition of the circuit controlling device.

Another object of this invention is to provide a magnetic contactor of a construction in which all contacts are disposed to be readily accessible and reversible from make to break or break to make.

Still another object of this invention is to provide a circuit controlling device of the electromagnetically operated type which is quiet in operation, develops the necessary force travel relationship, is easy to assemble, has a minimum number of operating parts and in which the parts are to be so disposed as to permit a relatively simple and quick assembly.

The objects recited are merely illustrative. Other objects and advantages will become more apparent from a study of the following specification and the accompanying drawings, in which.

Figure 5:
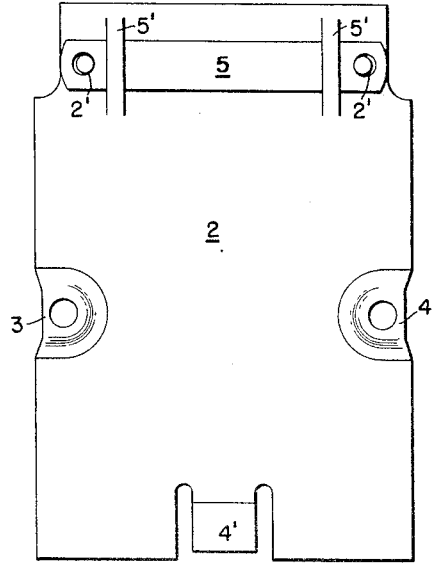
Fig. 5 shows a rear view of the base or mounting members for the electromagnetic contactors.
Figure 7:
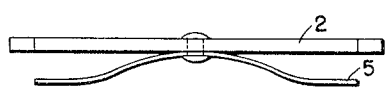
Figs. 6 and 7 show top sectional views of the base members for the electromagnetic contactor with different shock absorbing means.
Figure 6:
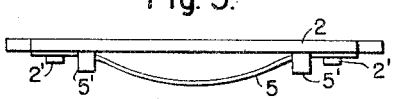

By referring to the drawings it will be noted that base plate 2 is provided with displaced portions 3, 4 and 4'. The displaced portions 3 and 4 have holes therein for receiving bolts to fix the base plate of the relay to a panelboard. A resilient flat spring member 5 is provided on the back of the base plate so that the displaced portions 3, 4 and 4' and the resilient spring member 5 will give a snug fit with a panelboard when the contactor is fixed thereto. This means of mounting permits positive mounting with only two mounting screws or bolts on surfaces which may not be perfectly flat. The resilient spring member 5 also absorbs the shock from the closing action of the contactor which decreases the armature and magnet face wear and increases the operating life of the contactor. Reference should be had to Figs. 5, 6 and 7 and the description thereof for a more detailed description of the base member 2 and its mounting means.

A bearing bracket 7 and electromagnet brackets 8 are also fixed to the base member 2. The electromagnet brackets 8 fit on each side of the electromagnet core 1 to hold the laminations together. A portion of each electromagnet bracket 8 extends perpendicular to the plane of the laminations and away from the core 1 so that the brackets may be fixed to the base member 2 and thus hold the core 1 in position. A coil 9 is provided on the center leg of the E-shaped electromagnet.

The bearing bracket 7 is one of four plates which form a parallelogram arrangement. The bearing bracket 7 has bearing surfaces at each end which are engaged by bearing edges of an upper rocker arm 10 and a lower rocker arm 11, respectively. The opposite bearing edge of the upper rocker arm 10 engages a bearing surface of the armature bracket 12 and the bearing edge of the opposite end of the lower rocker arm 11 engages the lower bearing surface of the armature bracket 12. The armature bracket 12 has a mounting bolt 13 projecting through two extensions on the armature bracket to secure the armature 14 of the contactor between the extensions. Extensions at the upper end of the armature bracket 12 are fixed to a contact actuating arm or support 15 by means of screws 16. The contact actuating arm has wall portions 15' which mate with wall portions 17 of the contact support means 6. The mating wall portions 15' and 17 increase the arc path between the contacts.

When the coil 9 is energized it causes the armature 14 to pick up and thus transmit motion through the parallelogram arrangement to the actuating arm 15. The contact assemblies 18 are actuated by the contact actuating arm 15 and thus the movable contacts of the contact assemblies 18 either bridge the fixed contacts 25 supported by the contact support means 6 or open the circuit between the fixed contacts. The coil 9 is held in position on the center leg of E-shaped electromagnet by means of spring members 19 fixed to the electromagnet bracket 8 on the sides of the electromagnet. The spring members 19 are fixed in such a manner that they may be rotated out of contact with the coil 9 to allow easy removal of the coil.

Figure 3:
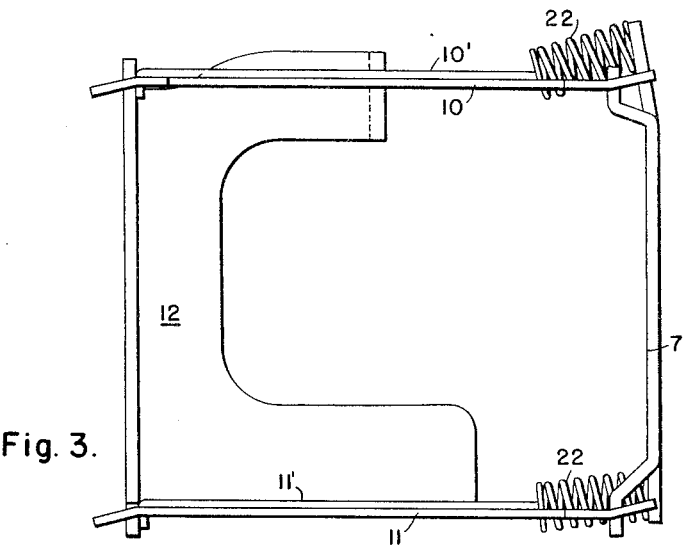
Fig. 3 shows the parallelogram arrangement through which motion is transmitted from the armature to the contact actuating means.
Figure 4:
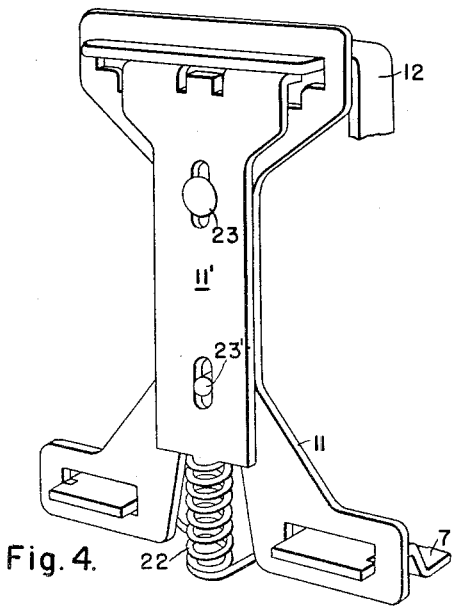
Fig. 4 shows details of the parallelogram arrangement.

The parallelogram arrangement through which the force is transmitted from the movable armature member 14 to the contact actuating arm 15 may be seen more clearly in Figs. 3 and 4. It is seen that the armature bracket 12 mounts on its identical rocker arms 10 and 11. The bearings formed at the junction of the rocker arms 10 and 11 and the armature bracket 12 are of the knife edged type. The opposite ends of the two rocker arms 10 and 11 are mounted on the bearing bracket 7 and the bearings formed by the junction of the rocker arms 10 and 11 with the bearing bracket 7 are also of the knife edged type.

Positive engagement is insured at each of the four bearings of the parallelogram arrangement by providing a slidable plate 10' attached to the upper rocker arm 10 and a slidable plate 11' slidably mounted on the lower rocker arm 11 and spring biasing the two slidable plates 10' and 11' away from the bearing bracket 7 by means of small compression springs 22.

As may be seen from Fig. 4, the slidable plate 11' is held to the rocker arm 11 by a shoulder rivet 23 which, together with pin 23', allows the plate 11 to slide freely in guided manner during any movement of the rocker arm 11. The spring 22 keeps the bearing edges of the rocker arm 11 in contact with the bearing surfaces of the bearing plate 7 and keeps the bearing edge of the rocker arm 11 in engagement with the lower bearing surface of the armature bracket 12 by means of the slidable plate 11'.

Since the upper rocker arm 10 is identical to the lower rocker arm 11 and has a slidable plate 10' fixed thereon in the same manner as the slidable plate 11' is fixed on the lower rocker arm 11, and since one of the resilient biasing springs 22 is provided in engagement with the bearing bracket 7 and one end of the slidable plate 10', the rocker arm 10 has its bearing edges in positive engagement with the bearing surfaces of the bearing plate 7 and the armature bracket 12 as described for the rocker arm 11.

Notice that the armature bracket 12 may be removed simply by pressing it against the slidable plates 10' and 11' and removing the ends thereof from the lateral slots provided in the respective rocker arms 10 and 11. Even with the armature bracket 12 removed it will be seen that the bearing edges of the other end of the rocker arms 10 and 11 are still held in positive engagement with the bearing surfaces of the bearing bracket 7 by means of the spring members 22. The spring members 22 between the rocker arm 10 of the bearing bracket 7 is set at an angle to give a torque couple at the bearing and provide a positive return force for the armature bracket 12 when the coil 9 of the electromagnetic contactor is deenergized.

Fig. 5 shows a rear view of the base member or mounting plate 2 in addition to the portions 3, 4 and 4' which are displaced to the rear of the base member 2 and punched portions 5' which are also displaced to the rear and which are equidistant from the vertical center line of the base plate 2 (or the center line of action of the electromagnetic armature 14). In the preferred mounting means, a flat spring member 5 is provided with its longitudinal axis perpendicular to the center vertical line of the base member 2 and has its ends extending through slots formed by the punched portion 5' and fixed to the base plate by embossed rivets 2'. The arrangement described has been found to be the most satisfactory means for positive mounting with only two mounting screws or bolts and reducing the shock and the armature and magnet face wear to a minimum.

Fig. 7 shows another means of obtaining positive mounting for the electromagnetic contactor on surfaces which may not be perfectly flat and providing a cushioning effect for the magnet and armature faces during operation. A rubber shock absorber might also be used to obtain a measure of the effect desired.

Figure 1:
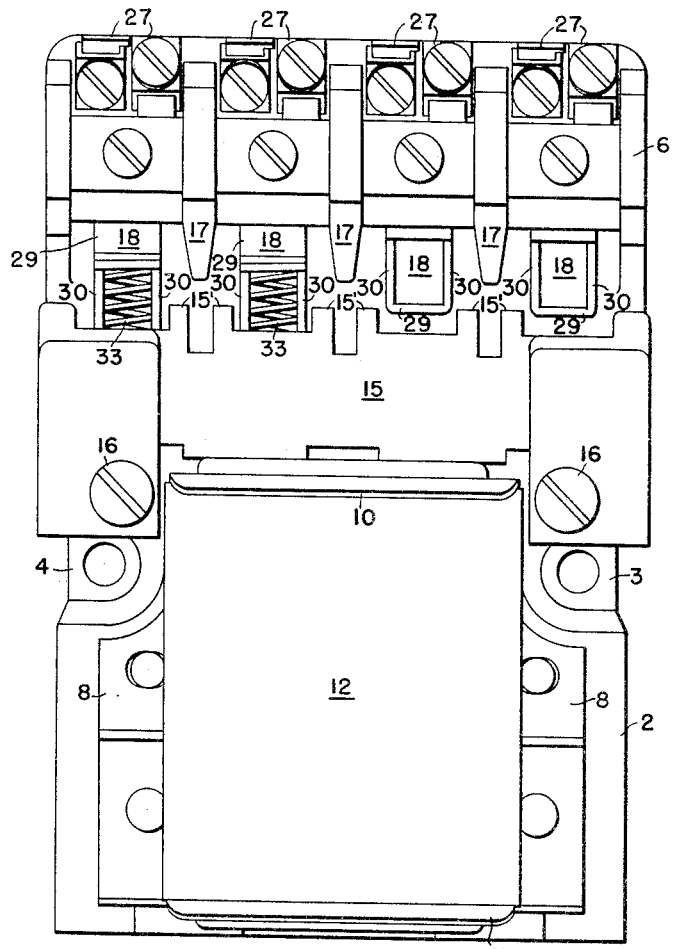
Figure 1 shows a front view of the assembled electromagnetic contactor.
Figure 2:
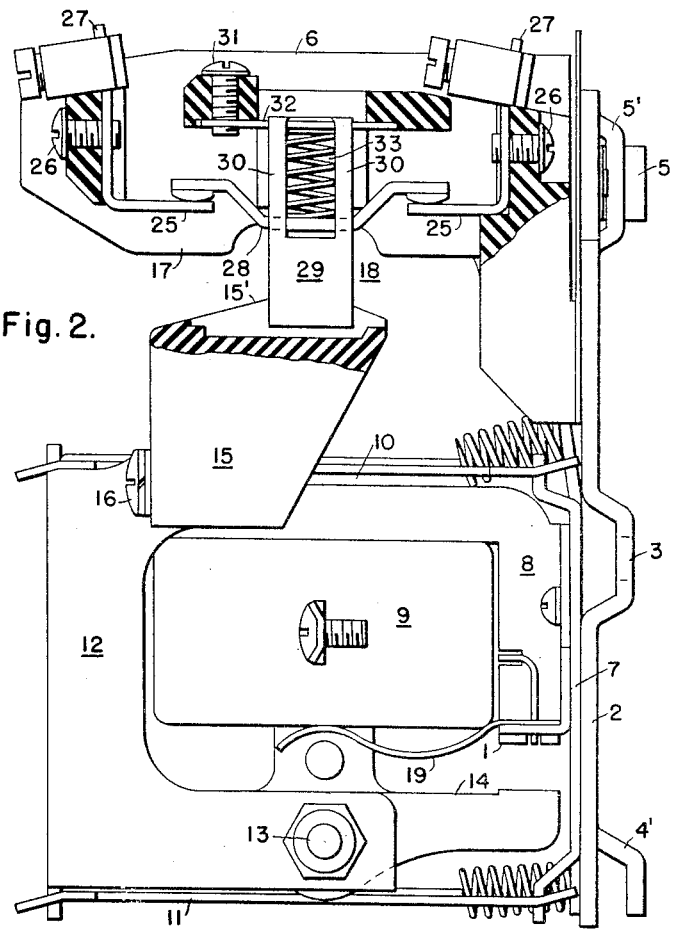
Fig. 2 shows a sectional side view of the assembled electromagnetic contactor.
Figure 8:
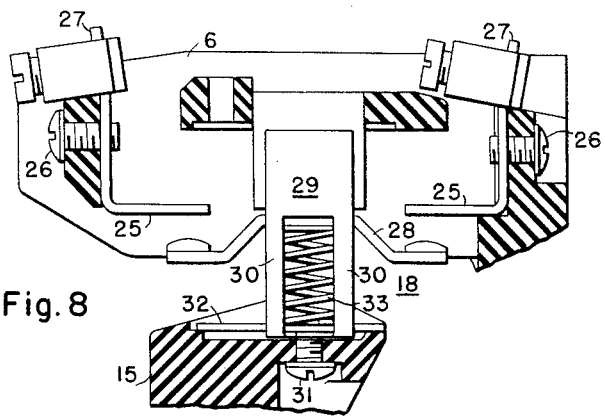
Fig. 8 shows a detailed view of a normally open contact assembly and contact assembly mounting means.
Figure 10:
Fig. 10 shows a top view of the movable contact members.
Figure 11:
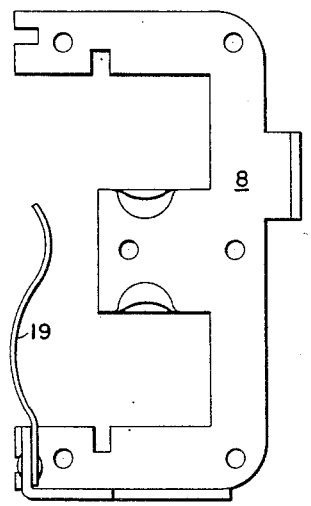
Fig. 11 shows a side view of the electromagnet bracket.
Figure 12:
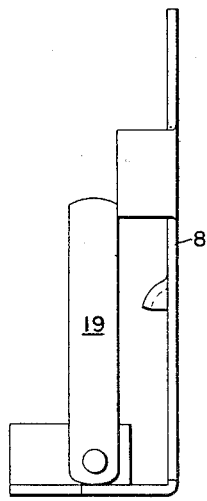
Fig. 12 shows a bottom view of the electromagnet bracket.

Figs. 2 and 8 show views of sections through the recesses in the contact support means 6. The contact assembly 18 is shown in its normally closed position in Fig. 2 and in its normally open position in Fig. 8. The stationary contact members 25 are held in position by the screws 26. The terminals 27 are brought out above the contact support means 6 so that they are readily accessible. The movable contact members 28 (a detailed top view is shown in Fig. 10) have four recesses along the sides which mate with the guide links 30 on the saddles 29.

In the normally open contact position shown in Fig. 8, the threaded end of the screw 31 enters a tapped saddle guide 32 and fastens the moving contact assembly 18 to the contact actuating arm 15.

The saddle 29 is formed at both ends. The bend at one end contains a clearance hole for mounting in the normally open position. The bend at the other end forms a large area which, when in contact with the actuating arm 15 during its travel assures little wear of the actuating arm surface and thus assures a long reliable life. A biasing spring 33 is provided between the bridging movable contact members 25 and the saddle guide 32, in order to hold the movable contacts 28 in position and assure good contact. The contacts' spring pressure may be varied to produce a loading more in line with the particular magnet design. If the movable contact assembly 18 is normally open as is shown in Fig. 8, when the armature 14 is picked up, the movable contacts 28 are forced to bridge the stationary contacts 25. The normally closed contact assembly, as shown in Fig. 2, is such that movement of the contact actuating arm 15 will move the saddle member 29 upward and thus cause the movable contacts 28 to be lifted from the stationary contact members 25. The configuration of the contact actuating arm 15, the saddle guide member 32, the saddle 29 and the contact support means 6 are such and the interrelationship of these parts are such that the saddle member 29 can be clamped only in the one position giving the right contact gap, alignment, and travel for the contacts in either the normally open or the normally closed arrangement.

To change from a normally open to a normally closed contact assembly it is merely necessary to remove the two mounting screws 16 for the contact actuating arm 15, remove the mounting screw 31 for the saddle guide member 32, invert the entire movable contact assembly 18 and place in the position shown in Fig. 2. The mounting screw 31 for the saddle guide member 32 loses its mounting function for the normally closed position of the contact assembly 18, since the contact biasing spring 33 will hold the assembly in position when the contacts are either closed or actuated by the contact actuating arm 15. The mounting screw 31 extends through a clearance hole in the fixed contact support means 6 and into a tapped hole provided in the saddle guide member or retainer 32 so that the contacts will be closed. The design is such that it is possible to assemble only in the correct position and with the minimum of wasted motion.

Figure 9:
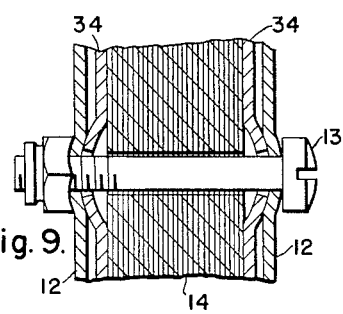
Fig. 9 shows a detailed sectional view of one embodiment of the armature mounting joint.

Fig. 9 shows a sectional view of the armature mounting joint. The side pieces 34 encompass the laminations of the armature 14. Rivets through the laminations of the armature 14 and the side pieces 34 hold the armature 14 together. On each of the two side pieces, there are spherical embossments which are located about the center of a hole used to mount the complete armature to extensions on the armature bracket 12. The embossed parts of the armature side pieces 34 mate with embossments on the armature bracket 12. Thus the embossments on the armature side pieces 34 form a partial sphere which is received in a partial socket on extensions of the armature bracket 12. The embossed parts of the armature hole bracket 12 and the armature side pieces 34 and the laminated steel sections are pierced to allow a mounting bolt 15 to pass through the hole. The holes on the center of the embossed armature side pieces and laminated steel sections are in clearance with the holding bolt allowing the armature assembly to rotate or be rotated to seat the pole pieces thereby allowing automatic alignment. The hole in the embossed parts of the armature holding bracket 12 is such that the mounting bolt 13 may pass through but only with clearance in the amount necessary to provide clearance for assembling the bolt and preventing rotation or movement of the bolt. When the bolt and locking device is tightened, a ball and socket joint is provided to allow the armature assembly to be rotated within the limit of the allowed clearance of the armature assembly and mounting bolt. In one embodiment the head of the bolt 13 and the nut thereon have their under surfaces shaped to match the surface of the embossed portions of the armature bracket 12. With this arrangement the armature can move about any axis intersecting the theoretical center of the sphere just described within the limits imposed by the clearance of the mounting bolt 13. Thus, when the coil of the electromagnetic contactor is energized several times the faces of the armature 14 are brought into forceful contact with the face of the electromagnet and the pole face alignment themselves so that the load is applied at the center of the pole, or sphere which in turn gives a balanced load condition. Since considerable friction is employed in the area of contact at the spherical contact surfaces, there will be no relative movement of the armature 14 in the armature bracket 12 after the pole faces have been aligned. As a consequence, the armature pole faces are held in alignment with the magnet pole face regardless of whether the device is sealed, open or in transition. After the original pole face is aligned, the nut on the mounting bolt 13 is tightened, thus increasing the frictional force in the joint which insures that there will be no movement in the armature mounting joint and consequently the wear in the joint and also wear of the pole face due to alignment is eliminated.

Figure 13:
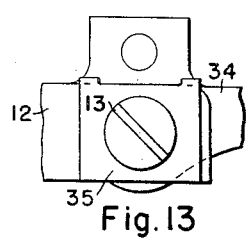
Figs. 13 and 14 show detailed sectional views of one embodiment of the armature mounting joint.
Figure 14:
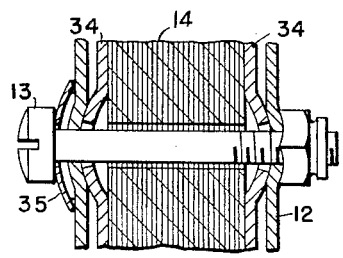

Figs. 13 and 14 show detailed sectional views of the preferred embodiment of the ball and socket armature mounting joint. A small sheet or leaf spring member is provided under the head or the nut of the mounting bolt 13 which exerts a force along the axis of the mounting bolt 13 when compressed. Thus the necessary friction in the armature mounting joint is insured. The resilient spring member 35 provides a floating and a bellows action and not only achieves the results of the previously described assembly but also insures that the pole faces are in alignment at all times.

The foregoing armature mounting assemblies, in normal operation, also provide a feature in which the normal thrust and stress encountered is taken on the spherical faces of the embossments and not on the tightening studs. This feature is of considerable importance in the life of the electromagnetic contactor.

It will be recognized that the objects of the invention have been achieved by providing an electromagnetic contactor whereby a single electromagnet is employed to control the opening or closing of the plurality of circuits by means of the operation of switches and contacts and by providing contacts that are easily reversed from make to break or break to make. In addition, the electromagnetic contactor provides that the load will be applied to the armature along an axis perpendicular to the plane of the pole faces and substantially through the theoretical center area of all pole faces resulting in a minimum amount of wear both on the pole faces and also in the armature mounting joint.

While in accordance with the patent statutes, one best known embodiment of the invention has been illustrated and described in detail, it is to be understood that the invention is not limited thereto or thereby, but that the inventive scope clearly includes equivalents.

We claim as our invention:

1. A quadrilateral mechanical linkage comprising, a bearing bracket, an upper rocker arm, and a lower rocker arm, said upper and lower rocker arms each having lateral slots in each end forming bearing edges in each end of said upper and lower rocker arms, a first plate slidably mounted on said upper rocker arm with its plane parallel to the plane of said upper rocker arm, a second plate slidably mounted on said lower rocker arm with its plane parallel to the plane of said lower rocker arm, a bearing bracket having end portions defining bearing surfaces extending through said lateral slots at one end of said upper and said lower rocker arms and an armature bracket having end portions defining bearing surfaces extending through said lateral slots at the opposite ends of said upper and lower rocker arms in such a manner that said upper and lower rocker arms and said armature bracket and said bearing bracket form a parallelogram for any position of said armature bracket with respect to said bearing bracket, a first resilient biasing means between one end of said first plate slidably mounted on said upper rocker arm and the bearing bracket to force the opposite end of said first slidably mounted plate against the armature bracket and cause positive engagement between the bearing edges of said upper rocker arm and said bearing surfaces of said armature bracket and bearing bracket, and a second resilient biasing means between one end of said second plate slidably mounted on said lower rocker arm and the bearing bracket to force the opposite end of said second slidably mounted plate against the armature bracket to cause positive engagement between the bearing edges of said lower rocker arm and the bearing surfaces of said armature bracket and bearing bracket.

2. An electromagnetic device comprising, a fixed core member and a movable armature member, said fixed core member and said movable armature member having physically matching faces, an armature side piece on opposite sides of said movable armature member, axially aligned portions of said armature side pieces being convex, a movable armature supporting member disposed on each side of said movable armature member and movably mounting said armature member with the faces thereof confronting the faces of said core and providing movement of said armature member toward and away from said core member, a portion of each supporting member for said armature member being concave to match and frictionally receive the convex surfaces of said armature side pieces to form a friction fit so the faces of the fixed core member and the movable member and the movable armature member will automatically align when the faces are together and the movable armature member and its supporting member will maintain their relative positions, and a coil mounted on said core member to produce armature attracting flux when said coil is energized.

3. An electromagnetic device comprising, a fixed core member and a movable armature member, each formed of a plurality of laminations and having physically matching faces, clamping means for said movable armature member including a side plate on each side of said armature member to hold the laminations together, said side plates each having thereon a partial spherical surface, said spherical surfaces being arranged in axial alignment, a supporting member on each side of said movable armature, each supporting member having a socket frictionally receiving the respective partial spherical surfaces, means movably mounting said supporting members with the face of said armature member confronting the face of said core member and providing movement of said armature member toward and away from said core member, slipping of said spherical surfaces in said sockets providing positive alignment of the faces of the fixed core member and the movable armature member when the faces are together, said sockets, spherical surfaces, and armature member having axially aligned holes therethrough, a mounting bolt passing through said axially aligned holes and arranged to press the sockets of said side members against said spherical surfaces so the friction between said partial spherical surfaces and the sockets may be increased after the faces of the movable armature member and the stationary core member have been aligned.

4. An electromagnetic device comprising, a base member, a bearing bracket fixed to said base plate, an upper rocker arm and a lower rocker arm, said upper and lower rocker arms each having lateral slots forming bearing edges in each end, a first plate, guide means on said upper rocker arm slidably mounting said first plate on said upper rocker arm with its plane parallel to the plane of said upper rocker arm, a second plate, guide means on said lower rocker arm slidably mounting said second plate on said lower rocker arm with its plane parallel to the plane of said lower rocker arm, said bearing bracket having end portions forming bearing surfaces extending through said lateral slots at one end of said upper and said lower rocker arms and an armature bracket having end portions forming bearing surfaces extending through said lateral slots at the opposite ends of said upper and lower rocker arms in such a manner that said upper and lower rocker arms and said armature bracket and said bearing bracket form a parallelogram for any position of said armature bracket with respect to said bearing bracket, means loosely securing said respective end portions in said respective slots, a first resilient biasing means between one end of said first slidably mounted plate and the bearing bracket to force the opposite end of said first slidably mounted plate against the armature bracket and cause positive engagement between the bearing surfaces of said armature bracket and bearing bracket, a second resilient biasing means between one end of said second slidably mounted plate and the bearing bracket to force the opposite end of said slidably mounted plate against the armature bracket to cause positive engagement between the bearing edges of said lower rocker arm and the bearing surfaces of said armature bracket and bearing bracket, a magnetic core member fixed to said base member, coil means in flux exchange relationship with said magnetic core member, an armature member positioned to receive the flux of said magnetic core member, said armature member being fixed to said armature bracket and adapted to move said armature bracket in response to a change of flux in said magnetic core member.

5. An electromagnetic device comprising a base member, a bearing bracket fixed to said base member, an upper rocker arm and a lower rocker arm, said upper and lower rocker arms each having lateral slots defining bearing edges in each end, a first plate slidably mounted on said upper rocker arm with its plane parallel to the plane of said upper rocker arm, a second plate slidably mounted on said lower rocker arm, said bearing bracket having end portions forming bearing surfaces extending through said lateral slots at one end of said upper and said lower rocker arms and an armature bracket having end portions forming bearing surfaces extending through said lateral slots at the opposite ends of said upper and lower rocker arms in such a manner that said first and second rocker arms and said armature bracket and said bearing bracket form a parallelogram for any position of said armature bracket with respect to said bearing bracket, a first resilient biasing means between one end of said first slidably mounted plate and the bearing bracket to force the opposite end of said first slidably mounted plate against the armature bracket and cause positive engagement between the bearing edges of said upper rocker arm and the bearing surfaces of said armature bracket and bearing bracket, a second resilient biasing means between said second slidably mounted plate and the bearing bracket to force the opposite end of said second slidably mounted plate against the armature bracket to cause positive engagement between the bearing edges of said lower rocker arm and the bearing surfaces of said armature bracket and bearing bracket, a magnetic core member fixed to said base member, coil means in flux exchange relationship with said magnetic core member, a movable armature member, said fixed core and said movable armature members having physically matching faces, and said movable armature member being positioned to receive the flux of said magnetic core member, an armature side piece on each side of said movable armature member, a portion of each armature side piece being convex, said convex portions being axially aligned, said armature bracket having extensions on opposite sides of said armature member, a portion of each extension being concave to match and frictionally receive the convex surfaces of said armature side pieces to form a friction fit, means movably mounting said armature bracket with the faces of said armature member confronting the faces of said core member and providing movement of said armature member toward and away from said core member, slipping of the frictionally engaged convex and concave surfaces providing positive alignment of the faces of the fixed core member and the movable armature member when the faces are together, frictional restraint maintaining the relative positions of said armature member with respect to said core member, said movable armature being adapted to move said armature bracket in response to a change of flux in said magnetic core member.

6. An electromagnetic device comprising a fixed core member and a movable armature member, each formed of a plurality of laminations and having physically matching faces, clamping means for said movable armature member including a side plate on each side of said movable armature member to hold the laminations together, said side plates each having thereon a partial spherical surface which has a common center point substantially at the lateral center of said armature member, a supporting member on each side of said movable armature, each supporting member having a socket frictionally receiving the respective partial spherical surfaces, means movably mounting said supporting members with the face of said armature member confronting the face of said core member and providing movement of said armature member toward and away from said core member, slipping of said spherical surfaces in said sockets providing positive alignment of the faces of the fixed core member and the movable armature member when the faces are together, said sockets, spherical surfaces and armature member having substantially axially aligned holes therethrough, a mounting bolt passing through said axially aligned holes and arranged to press the sockets of said side members against said spherical surfaces so the friction between said partial spherical surfaces and the sockets may be increased after the faces of the movable armature member and the stationary core member have been aligned, and a resilient spring member held by said mounting bolt against one supporting member and exerting a force substantially along the axis of the bolt.

References Cited in the file of this patent

UNITED STATES PATENTS

| | | |
|---|---|---|
| 1,860,054 | Roller | May 24, 1932 |
| 1,970,520 | Hanny | Aug. 14, 1934 |
| 2,172,633 | Wilms | Sept. 12, 1939 |
| 2,310,056 | Bendz | Feb. 2, 1943 |
| 2,347,934 | Christensen et al. | May 2, 1944 |
| 2,360,744 | Van Valkenburg et al. | Oct. 17, 1944 |
| 2,538,036 | Postingl | Jan. 16, 1951 |
| 2,561,991 | Postingl | July 24, 1951 |
| 2,584,707 | Jarvis et al. | Feb. 5, 1952 |